United States Patent
Fierro

[19]

[11] Patent Number: 5,983,195
[45] Date of Patent: Nov. 9, 1999

[54] METHOD AND SYSTEM FOR SCHEDULING PRODUCT ORDERS IN A MANUFACTURING FACILITY

[75] Inventor: Paul C. Fierro, Sterling Heights, Mich.

[73] Assignee: Electronic Data Systems Corporation, Plano, Tex.

[21] Appl. No.: 08/870,513

[22] Filed: Jun. 6, 1997

[51] Int. Cl.[6] .................................................. G06F 17/60
[52] U.S. Cl. .................. 705/10; 364/468.06; 364/468.08
[58] Field of Search ........................ 705/10; 364/468.06, 364/468.08, 468.07

[56] References Cited

U.S. PATENT DOCUMENTS

| 5,463,555 | 10/1995 | Ward et al. | 364/468 |
| 5,615,121 | 3/1997 | Babayev et al. | 705/9 |
| 5,737,728 | 4/1998 | Sisley et al. | 705/8 |
| 5,826,236 | 10/1998 | Narimatsu et al. | 705/8 |

*Primary Examiner*—Allen R. MacDonald
*Assistant Examiner*—Penny Caudle
*Attorney, Agent, or Firm*—L. Joy Griebenow; Baker & Botts L.L.P.

[57] ABSTRACT

The invention comprises a method and system for scheduling product orders for a manufacturing facility. One aspect of the invention is a method for scheduling product orders wherein a pool of product order records and a pool of physical attribute records are maintained. A list of partially completed physical products available at an evaluation point in a manufacturing facility is maintained wherein the list includes a first physical attribute record. A digital computer is then used to compute a grade value for each of a plurality of product order records having a list of order attributes comprising sets of which the list of physical attribute data items associated with the first physical attribute record is a subset. The grade value comprises a weighted sum of a plurality of objective factors where each objective factor comprises a numerical measure of how well a particular objective is being met. One of the plurality of product order records is associated with the first physical attribute record based upon the grade value of each of the plurality of product order records.

21 Claims, 2 Drawing Sheets

METHOD AND SYSTEM FOR SCHEDULING PRODUCT ORDERS IN A MANUFACTURING FACILITY

TECHNICAL FIELD OF THE INVENTION

This invention relates generally to computer control of manufacturing processes and more particularly to a method and system for scheduling product orders in a manufacturing facility.

BACKGROUND OF THE INVENTION

In some industries, manufacturers produce similar but varying products where product variance depends upon customer choice of various options. The automobile industry, for many models of cars, is an example, as customers may choose from a number of options for certain models and then obtain an automobile matching their desires from the factory. Some manufacturers of personal computers also allow customers to select various options and then custom build a computer to meet the customer's desires. Similarly, other industries also allow customers their choice of options.

In many manufacturing facilities that produce similar products containing customer-defined options, methods used for processing orders are often fixed. A particular customer order may be coupled to a physical product very early in the manufacturing process. Once the order is coupled to the physical product, a one-to-one relationship between the order and that physical product remains intact throughout the assembly process. When the physical product is delayed, then so is the order associated with it. Thus, orders may not be decoupled from partially completed physical products and recoupled with a different partially completed product during the manufacturing process. The inability of existing computerized manufacturing scheduling systems to decouple an order from a physical product being manufactured defeats the ability to expedite an order once that order has been coupled to a specific product.

Manufacturers may also employ computerized scheduling systems at multiple evaluation points in a manufacturing facility. At these evaluation points, there may be multiple physical products from which to choose to pass on to the next manufacturing step. Existing systems normally base this decision upon a predetermined business objective. Because business objectives may change from day-to-day or hour-to-hour, existing systems do not allow adequate flexibility to adjust to changing business objectives.

SUMMARY OF THE INVENTION

The invention allows the dynamic association of product orders with a physical product being manufactured. Such dynamic association may occur at multiple points in the manufacturing process. The invention may also schedule physical products for the next manufacturing step at these points. Such scheduling may take into account various objectives that may be weighted differently from time-to-time based upon user input.

One aspect of the invention is a method for scheduling product orders for a manufacturing facility. A pool of product order records and a pool of physical attribute records are maintained. Each product order record corresponds to a product order and comprises a plurality of order attributes. Each physical attribute record comprises a list of physical attribute data items collectively identifying the existing physical features of a product. At an evaluation point in the manufacturing facility, a first list of partially completed physical products is maintained, including a first physical attribute record. Using a digital computer, a grade value is computed for each of a plurality of product order records having a list of order attributes comprising sets of which the list of physical attribute data items associated with the first physical attribute record is a subset. The grade value comprises a weighted sum of a plurality of objective factors where each objective factor comprises a numerical measure of how well a particular objective is being met. One of the plurality of product order records is then associated with the first physical attribute record based upon the grade value of each of the plurality of product order records.

The invention has several important technical advantages. The invention allows orders to be dynamically assigned and reassigned to physical products in the manufacturing plant. Such dynamic order assignment allows the invention to take into account the objective of responsiveness to market demand and to expedite orders for certain customers. By lowering manufacturing lead time, a manufacturer employing the present invention may increase customer satisfaction.

The invention also allows flexibility in scheduling physical products at various evaluation points within a manufacturing facility. Such scheduling may take place in real time and allows dynamic adjustment to conditions within the manufacturing facility. Because scheduling may occur at several points in the manufacturing facility, the invention may perform scheduling in accordance with differing objectives for that particular point in the manufacturing facility. Business objectives may also vary by the point in the manufacturing process, or may vary over time. The invention allows a user to dynamically readjust the importance of various objectives. Various business objectives may be controlled based upon a user-defined number of jobs. For example, levelness in the manufacturing process can be measured based upon a specific number of jobs. This value can be changed in real time to allow the computerized scheduling system to dynamically adjust to changing conditions within the plant.

The invention also can dynamically adjust to conditions within the manufacturing facility that might otherwise lead to a work stoppage. For example, if defects are discovered in a particular lot of parts or a particular part becomes unavailable, the invention allows products with the relevant attribute to be placed on hold. The invention then attempts to maximize the business objectives using the remaining available physical products.

BRIEF DESCRIPTION OF THE DRAWINGS

For a more complete understanding of the present invention and the advantages thereof, reference is now made to the following descriptions, taken in connection with the accompanying drawings, in which.

DETAILED DESCRIPTION OF THE INVENTION

Figure 1:
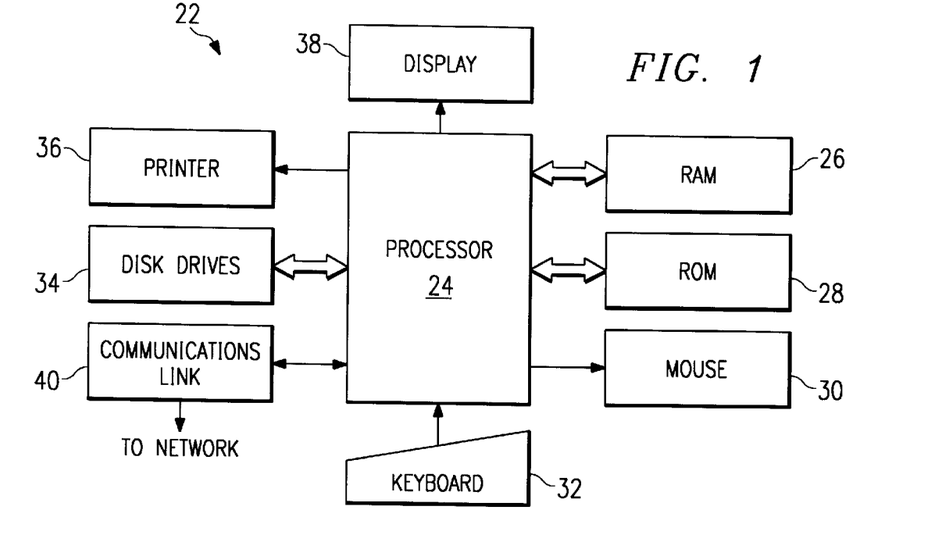
FIG. 1 illustrates a block diagram of a computer that may be used to implement the present invention.
Figure 2:
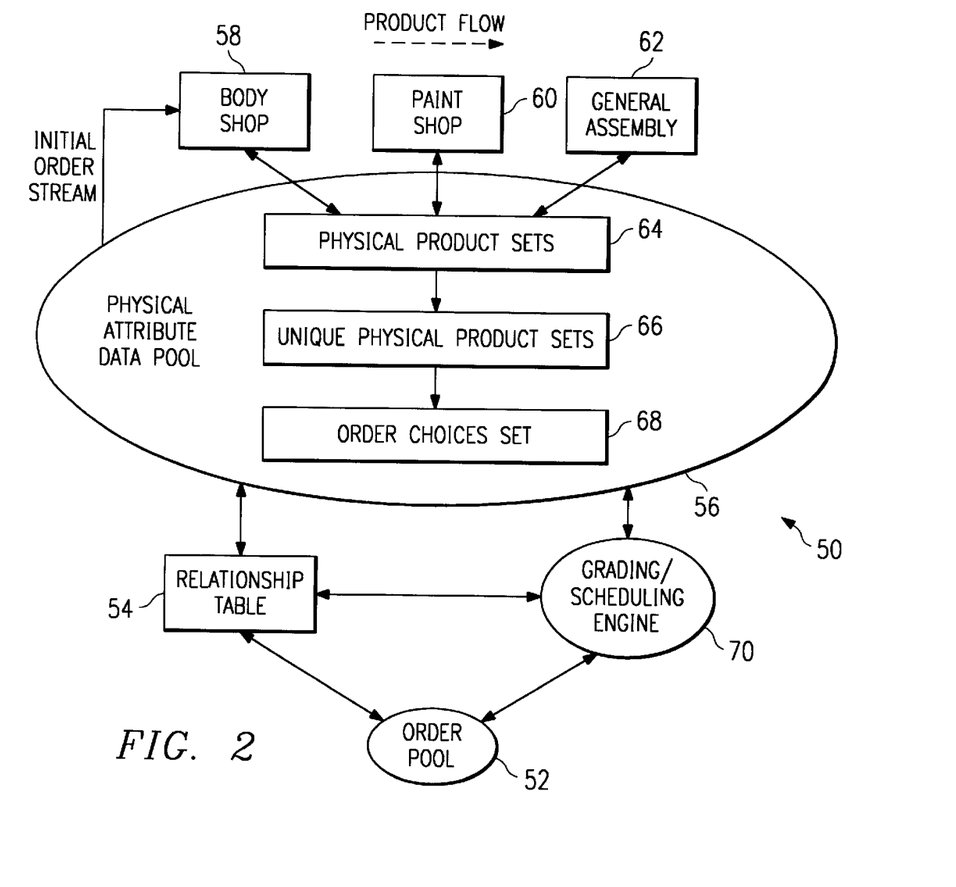
FIG. 2 illustrates a block diagram of computer scheduling and order assignment software constructed in accordance with the invention.
Figure 3:
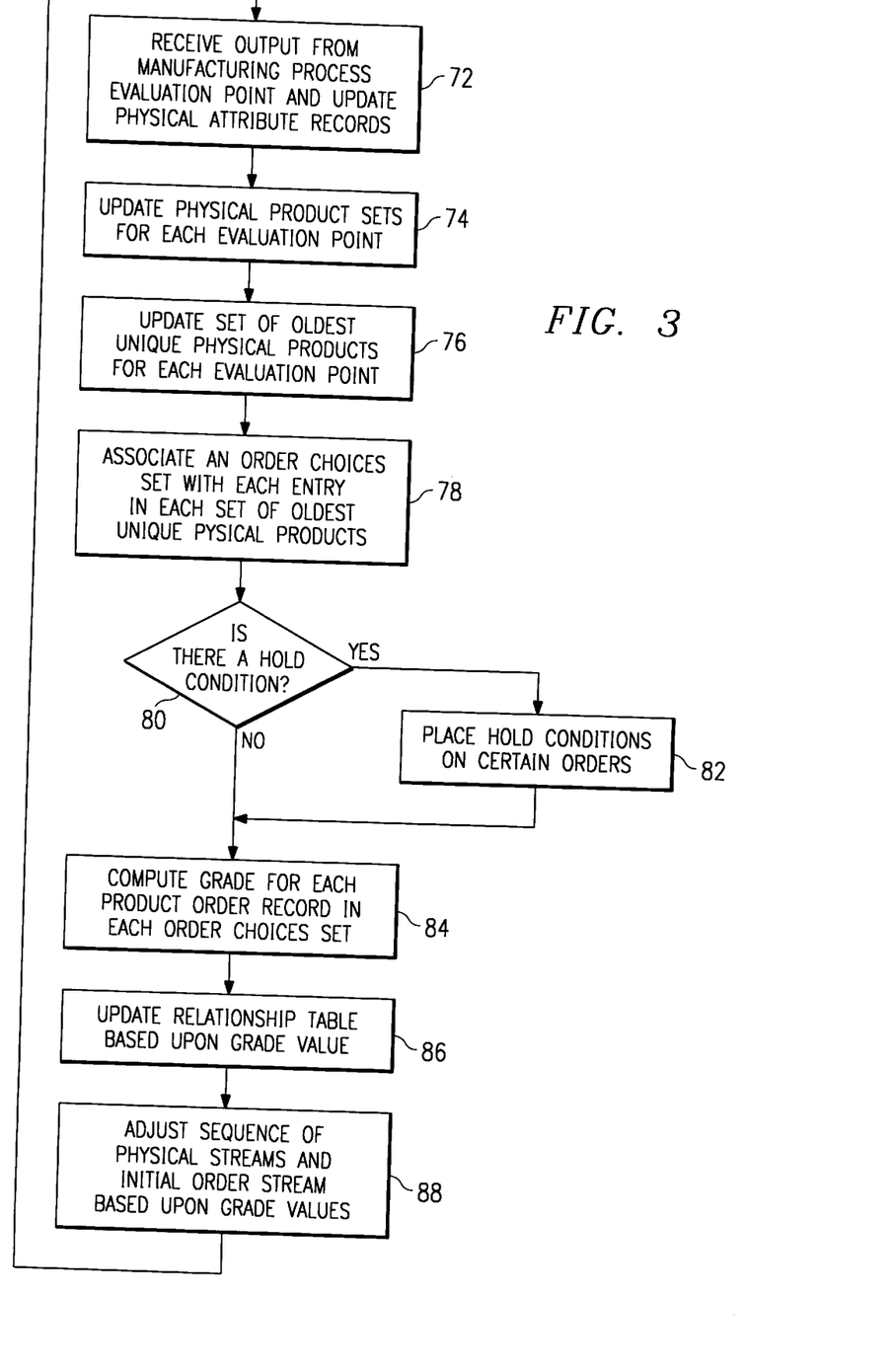
FIG. 3 illustrates a flowchart of the operation of the embodiment of the invention illustrated in FIG. 2.

The preferred embodiment of the present invention and its advantages are best understood by referring to FIGS. 1–3 of the drawings, like numerals being used for like and corresponding parts of the various drawings.

FIG. 1 illustrates a general purpose computer 22 that may be used with the software discussed in connection with FIGS. 2 and 3. General purpose computer 22 may be used to execute applications comprising computer software for scheduling and assigning product orders in accordance with the present invention. General purpose computer 22 may also be adapted to execute any of the well-known MS-DOS, PC-DOS, OS2, UNIX, MAC-OS and WINDOWS operating systems or other operating systems. General purpose computer 22 comprises processor 24, random access memory (RAM) 26, read only memory (ROM) 28, mouse 30, keyboard 32 and input/output devices, such as disk drives 34, printer 36, display 38 and communications link 40. The present invention includes programs that may be stored in RAM 26, ROM 28 or disk drives 34 and may be executed by processor 24.

Communications link 40 may be connected to a computer network and could also be connected to a telephone line, an antenna, a gateway, or any other type of communication link. Disk drives 34 may include a variety of types of storage media such as, for example, floppy disk drives, hard disk drives, CD ROM drives, or magnetic tape drives. Although this embodiment employs a plurality of disk drives 34, a single disk drive 34 could be used without departing from the scope of the invention. FIG. 1 only provides one example of a computer that may be used with the invention. The invention could be used on computers other than general purpose computers, as well as on general purpose computers without conventional operating systems.

FIG. 2 illustrates a block diagram of computer scheduling and order assignment system 50. Computer scheduling and order assignment system 50 comprises order pool 52, relationship table 54, physical attribute data pool 56 and grading and scheduling engine 70. Although any type of computer software techniques may be used to create computer scheduling and order assignment system 50, this embodiment of the invention employs object-oriented techniques.

Order pool 52 comprises an instance of an order pool object class. Order pool 52 contains a plurality of orders. Each order contained in order pool 52 comprises a set of data that will be used to assign orders to physical products and to schedule the orders within the manufacturing facility. In this embodiment, each order comprises an instance of an object class contained in order pool 52. Orders could also be stored in any other type of data structure, such as an array of records or a linked list.

Order pool 52 may interface to an order creation system (not explicitly shown) that receives customer orders from remote locations. The order creation system may provide more data to order pool 52 than is required for purposes of assigning the order to a physical product and sequencing physical products and orders in the manufacturing facility. Accordingly, order pool 52 preferably stores only the data needed for these purposes.

To protect against loss of data in case of system failure, order pool 52 may also contain a method for logging product order records to disk. Note that the term "record" is used broadly to refer to a collection of data. A product order record, then, is a collection of data relating to a product order. The use of the term "record" does not fix the structure in which the data is stored. This meaning shall attach to any use of the word record for purposes of this application.

With each order record in order pool 52, an instance variable is maintained that indicates the status of a particular order within the manufacturing facility. The status instance variable indicates the position of the physical product to which the order is currently linked within the manufacturing facility. The status instance variable might also indicate that the order currently resides in an initial order stream that has been linked to a null physical attribute record. A null physical attribute record has no physical characteristics associated with it, and is used as an initial association with an order in an initial order stream provided to the manufacturing starting point in the manufacturing facility. The status of each order could also be maintained in a table in order pool 52 or could be maintained elsewhere in computer scheduling and order assignment system 50 without departing from the scope of the invention.

Relationship table 54 comprises an instance of a relationship table object. Relationship table 54 could also be an object contained in another object, such as order pool 52 or physical attribute data pool 56. Relationship table 54 could also be a data structure contained in order pool 52, physical attribute data pool 56, grading and scheduling engine 70 or in some other part of computer scheduling and order assignment system 50.

Relationship table 54 maintains a link between physical attribute records in the physical attribute data pool 56 and product order records in order pool 52. Thus, relationship table 54 allows components of computer scheduling and order assignment system 50 to determine the current linkage between any physical product within the manufacturing facility and the order assigned to that physical product. Relationship table 54 could be eliminated by storing linkage information in either the product order records or the physical attribute records, or in both types of records.

Physical attribute data pool 56 comprises an instance of a physical attribute data pool object class. As described above, physical attribute data pool 56 could be implemented in many different ways, as could any of the components of computer scheduling and order assignment system 50, without departing from the scope of the invention. Physical attribute data pool 56 comprises a plurality of physical attribute records wherein each physical attribute record comprises an instance of a physical attribute record object class. Physical attribute records, as with product order records, could be implemented in some type of data structure such as an array of records or a linked list.

Each physical attribute record comprises an identification of a physical product within a manufacturing facility and a list of relevant attributes describing that physical product. In this example, these physical attributes are identified using alphanumeric codes in the physical attribute record. The physical attribute record contains only those attributes describing the current state of a physical product. For example, during the manufacturing process for a car, a car might have a physical attribute describing its body type, its color and its engine type. After the car has gone through the body shop, the physical attribute record for that car would only contain an identification of the body type. After the body has been painted, the physical attribute record would contain the body type and color. Then, after the engine was added, the physical attribute record would contain an identification of the body type, color, and engine type. The physical attribute record, then, describes the current physical condition of each complete or partially complete physical product within the manufacturing facility.

In the computer industry, a physical attribute record might begin with a chassis type. As the motherboard is added, the physical attribute record would be updated accordingly. Similar updates would occur for the disk drive, etc.

When orders are received by order pool 52, they are placed in an initial order stream. The initial order stream links a product order record to a null physical attribute record. The initial order stream thus contains an ordered list of product order records to be processed for which manufacturing has not begun. The initial order stream is created by grading and scheduling engine 70 in this embodiment.

The embodiment of scheduling and assignment system 50 illustrated in FIG. 2 is an embodiment that might be used within an automotive assembly plant. The invention can be used for any industry, however, and is not limited to the automotive industry. In the illustrated example, computerized scheduling and order assignment system 50 controls the scheduling and assignment of orders to physical products in the initial order stream, between body shop 58 and paint shop 60, between paint shop 60 and general assembly 62, and can control order assignment after assembly is completed in general assembly 62. The embodiment provided in FIG. 2 is provided by way of example only and more or less evaluation points for scheduling and order assignment could be provided without departing from the scope of the invention.

A brief overview of the operation of computerized scheduling and order assignment system 50 will now be provided in connection with the example illustrated in FIG. 2. An initial order stream is generated by grading and scheduling engine 70 to be provided to body shop 58. The initial order stream provides an ordered list of product order records to be processed by body shop 58. As bodies emerge from body shop 58, the physical attribute record associated with the body is updated. Grading and scheduling engine 70 may then reassign a particular product order record to the physical attribute record associated with the physical product that has emerged from body shop 50. Grading and scheduling engine 70 may also generate the sequence in which physical products emerging from body shop 58 are sent to paint shop 60. Similarly, after a particular physical product has been painted in paint shop 60, the physical attribute record corresponding to the physical product that has been painted will be updated. At this point, grading and scheduling engine 70 may reassign a different product order to a particular physical product and may also generate the sequence in which painted products emerging from paint shop 60 are sent to general assembly 62. As products emerge from general assembly 62, grading and scheduling engine 70 may reassign product orders to a completed physical product.

More generally, the invention provides an initial order stream into a manufacturing facility. The manufacturing facility may contain one or more evaluation points where computer scheduling and order assignment system 50 may associate product orders with completed or partially completed physical products. Computer scheduling and order assignment system 50 may also generate the sequence in which partially completed physical products are sent from that evaluation point to the next manufacturing station in the manufacturing facility. The invention can accomplish scheduling and assignment in real time and can dynamically adjust to meet various conditions occurring within the manufacturing facility.

Particular areas within a manufacturing facility may have existing computerized scheduling systems that create a sequence of jobs to be processed within that particular area. The present invention may replace those systems or may interface with those systems such that the existing system controls scheduling within a particular area and the invention controls scheduling within other areas in a manufacturing facility. In addition, if existing systems are used for scheduling, the invention may still be used for order assignment at various points in the manufacturing facility.

At evaluation points within the manufacturing facility such as body shop 58, paint shop 60, and general assembly 62 in this example, an electronic indication is provided to physical attribute data pool 56 that a particular physical product has had a change in physical attributes. For example, an electronic system in paint shop 60 may provide an indication to physical attribute data pool 56 that a particular physical product is now red in color. This information could be manually input by workers at particular points in the manufacturing facility or could be determined electronically based upon output from automated assembly machines or some indicia on the product such as a bar code. Scheduling and assignment system 50 will also provide feedback to the evaluation points to indicate the sequence in which physical products are to be sent from that evaluation point to the next point in the manufacturing facility. For example, the physical attribute data pool 56 may provide input to the body shop 58 to indicate the order in which vehicles are to be sent to paint shop 60.

Physical attribute data pool 56 also contains one or more physical product sets. In this embodiment, each physical product set comprises an instance of a physical product set object class. A different physical product set is provided for each evaluation point where scheduling and/or assignment control within the manufacturing facility is desired. Because this embodiment of the invention is object-oriented, adding a new evaluation point within the manufacturing facility is readily accomplished by generating an additional instance of a physical product set object. Physical product set 64 is updated after a change of physical attributes at a relevant evaluation point.

Physical product set 64 comprises a list of all physical products available at a particular evaluation point. For example, physical product set 64 may contain a list of all physical products that have been completed by body shop 58 and are awaiting transport to paint shop 60. Thus, a physical product set 64 for body shop 58 would contain a list of those physical products for which the assembly job performed by body shop 58 is complete. Similarly, a different physical product set 64 would indicate those vehicles that have been painted by paint shop 60 and are awaiting transport to general assembly 62. A physical product set 64 may also indicate those physical products for which general assembly 62 has completed assembly. This last physical product set 64 would indicate the physical characteristics of a completed product that has not yet been shipped from the manufacturing facility.

After an update to a physical product set 64, an update may or may not occur to a unique physical product set 66. As with physical product sets 64, each unique physical product set 66 comprises an instance of a unique physical product set object. There is a unique physical product set 66 associated with each evaluation point, such as body shop 58, paint shop 60, and/or general assembly 62 in this embodiment. The use of object-oriented techniques for unique physical product set 66 also allows dynamic creation of evaluation points within a manufacturing facility.

A unique physical product set 66 for a particular evaluation point comprises a subset of the physical product set 64 for that evaluation point. The unique physical product set 66 for an evaluation point contains a single entry for each unique physical product appearing in the physical product set 64 associated with that evaluation point. In other words, if there are five products in physical product set 64 at a particular evaluation point with identical physical attribute data items in their physical attribute records, then only one of the five physical products is placed in unique physical product set 66. Note that physical product sets 64, unique physical product sets 66 and order choices sets 68 may be implemented as lists.

The choice of which physical product to place in unique physical product set 66 may depend upon the age of the various identical physical products appearing in the corresponding physical product set 64. Ordinarily, a manufacturing plant would desire to first consume the oldest physical product available. Of a plurality of identical physical products in physical product set 64, then, the oldest identical product may be chosen for placement in unique physical product set 66. The decision as to which physical product to place in unique physical product set 66 may be complicated, however, if the manufacturing facility employs an automatic storage and retrieval system (ASRS). When an ASRS is employed, an older physical product may need to be retrieved using the ASRS system. Retrieval may be inefficient compared to the use of a physical product that has not been placed in the ASRS system. Thus, computer scheduling and order assignment system 50 may assign physical products to a unique physical product set 66 based upon both the age of the physical product and the efficiency in retrieving a physical product using an ASRS.

Both physical product set 64 and unique physical product set 66 comprise a list of physical attribute records in this embodiment. Each physical attribute record comprises a list of physical attribute data items collectively identifying existing physical features of a product. Any type of data structure could be used to implement physical product set 64 and unique physical product set 66 without departing from the scope of the invention.

An order choices set 68 is created for each entry contained in each unique physical product set 66. For example, there may be a unique physical product set 66 associated with body shop 58 and a unique physical product set 66 associated with paint shop 60. Suppose that the unique physical product set 66 for body shop 58 contains twelve entries and the unique physical product set 66 for paint shop 60 contains fifteen entries. Each of the entries in these unique physical product sets would be associated with one of twenty-seven order choices sets 68.

An order choices set 68 comprises a set of all orders available in order pool 52 whose order attributes match the physical attribute data items associated with a particular physical attribute record contained within a unique physical product set 66 provided that the order has not already been assigned to a physical attribute record at the current evaluation point associated with the physical attribute record or at a later evaluation point. For example, for a particular physical attribute record contained in the unique physical product set 66 for body shop 58, the order choices set 68 for that entry would include all product order records having a set of order attributes to which the physical attribute data items associated with the physical attribute record were a subset provided that product order records can only be chosen that have been assigned to physical attribute records currently being processed by the body shop or in the initial order stream. In other words, the order choices set 68 for a particular entry in the unique physical product set 66 for body shop 58, in this embodiment, would not contain any product order records that are already associated with physical attribute records either in the physical product set 64 for body shop 58 or with a physical attribute record associated with a physical product that has been processed beyond body shop 58.

Grading and scheduling engine 70 comprises an instance of a grading and scheduling engine object class. Grading and scheduling engine 70 could also be implemented without using object-oriented techniques. Grading and scheduling engine 70 is operable to compute grade values for members of the order choices sets 68. The grade values comprise a weighted sum of a plurality of objective factors wherein each objective factor comprises a numerical measure of how well a particular objective is being met. Based upon the grade value computed for each order in the order choices set, grading and scheduling engine 70 will select the best order represented by a product order record to assign to a particular physical product represented by its physical attribute record in a unique physical product set 66. In addition, grading and scheduling engine 70 will use the grade value to determine which physical product should next be sent to a particular point in the manufacturing facility. For example, grading and scheduling engine 70 will use grade values to determine the next body that has been completed by body shop 58 to send to paint shop 60. The decision as to which physical product to schedule for the next point in the manufacturing facility also depends upon the objective factors used to perform order assignment.

Grading and scheduling engine 70 may perform scheduling and order assignment on a real-time basis in an iterative fashion or in an event responsive fashion. In other words, grading and scheduling engine 70 may continuously iterate through all order assignment and scheduling decisions and change decisions as appropriate or it may make scheduling decisions and/or order assignment decisions in response to specific events, such as the update of a physical attribute record.

Grading and scheduling engine 70 also allows the ability to place particular product order records or physical attribute records on hold. Orders or products may be placed on hold, for example, when there is material shortage for a certain option. Because the invention allows real-time scheduling and order assignment, the system can respond to unexpected conditions in the manufacturing facility with less disruption to the manufacturing process than would otherwise occur. When a hold condition exists, grading and scheduling engine 70 does not compute a grade nor schedule or assign the held orders and/or products.

The grade value comprises a weighted sum of a plurality of objective factors. Each objective factor comprises a numerical measure of how well a particular objective is being met. In this embodiment, the user of grading and scheduling engine 70 may designate a number of objectives that may be desirable for the manufacturing facility to attempt to meet. Depending upon the area within the manufacturing facility and/or the particular conditions within the manufacturing facility at a given time, the relative weight to be assigned to each objective may vary. Thus, the invention allows the user of grading and scheduling engine 70 to adjust the relative weight assigned to the objective factors used to calculate the grade value. In addition, the user may define rules for calculating the grade value that may vary depending upon the evaluation point within the manufacturing plant. In the example illustrated in FIG. 2, then, the user may assign a first weight to a specific objective for body shop 58 and a different weight to that objective when making decisions for paint shop 60. In other words, a unique grading algorithm may be provided for each evaluation point within the manufacturing facility and the user of grading and scheduling engine 70 may adjust the relative weights of each objective factor at each evaluation point.

This embodiment uses order attributes associated with product order records and physical attribute data items associated with physical attribute records to calculate the grade value. The attributes comprise product models, product options, and/or boolean expressions of product models and/or product options. Each business objective may have one or more rules that operate on particular attributes to compute a factor associated with that particular objective. These rules may be defined by the user and any number of rules may be used.

In this embodiment, four objectives are used in calculating the grade value. These objectives are stability, levelness, responsiveness, and spacing. Based upon a member of one of the unique physical product sets 66, grading and scheduling engine 70 calculates a grade based upon these objectives for each member of the order choices set 68 associated with that member of unique physical product set 66. The weights and rules used for the calculation will depend upon the current position of the member of unique physical product set 66 within the manufacturing facility.

Stability is a measure of how well a predefined schedule is met. In making orders to part suppliers for a manufacturing facility, a proposed schedule based upon current orders may be established hours or days in advance. The stability objective seeks to consume parts at the same rate as was called for in the original proposed schedule. In other words, if the schedule were reproduced exactly, then the stability objective would be perfectly met. To measure stability, a total number of jobs is normally divided into a smaller number of batches or buckets. Each batch or bucket contains a defined number of jobs. In this embodiment, batch or bucket sizes of sixty may be used as sixty corresponds to an average number of jobs completed within an hour at various points in the assembly process. The bucket size used to make the measurement may vary depending upon the point within the assembly process. In this example, a window is used to measure stability where the window size corresponds to a particular bucket size used for the stability measurement when generating a proposed schedule. A stability rule may also include an offset indicating a point in the stream of orders where data should start to be recorded on a per batch or per bucket basis.

Stability may be measured in accordance with the following equation:

$$\text{Stability} = w_1 s_1 + w_1 s_1 \ldots + w_n s_n$$

Each term, $w_x s_x$, refers to the application of a particular stability rule. Again, the user may create any number of stability rules to be applied at any particular evaluation point by grading and scheduling engine 70. The "$w_x$" term corresponds to a weighting factor for a particular stability rule. The weight may correspond to a measure of the cost of picking a particular option. Because certain parts may be more costly and may be more difficult to obtain from suppliers, a different cost may be incurred for deviating from a particular stability goal. Accordingly, the weighting factor may be adjusted to take into account these differences between the relative harm to stability from various options.

The stability score, "$s_x$," may be computed using the following formula:

$$s_1 = y_1 - \left( \frac{x_1 \times k}{\text{windowsize}} \right)$$

The term "$y_1$" refers to the actual number of jobs that have been scheduled containing the attribute under consideration within the window defined by the batch or bucket size. The term "k" refers to the total number of jobs scheduled in the window so far. The term "$x_1$" refers to the target statistic for the bucket under consideration. The target statistic corresponds to the actual number of jobs for the batch under consideration that contained a given option in the same batch in the proposed schedule, adjusted by any error from previous buckets.

An example will illustrate the computation of the value of the target statistic. When the proposed schedule is generated, that schedule may indicate that from 10:00 a.m. on Tuesday to 11:00 a.m. on Tuesday the jobs passing through body shop 58 will contain twenty-three bodies with sunroofs. As the orders actually pass through the body shop 58 on the actual Tuesday in question between 10:00 a.m. and 11:00 a.m., the target statistic that will be used will be the previously determined target statistic of twenty-three, adjusted by any error from previous buckets. The error from previous buckets accounts for overuse or underuse of a particular part. The same example will be used to illustrate this error propagation. Suppose that from 9:00 a.m. to 10:00 a.m., the target statistic (also adjusted by propagated error) was to use thirteen bodies with sunroofs, but only eleven were used. The target statistic used for 10:00 to 11:00 will then be twenty-five—the historically proposed number plus the error from the previous batch.

The window (batch or bucket) size may be determined by the user of grading and scheduling engine 70. Depending upon the particular strategy of the operators of the manufacturing facility, stability may be more or less important depending upon the period of time over which it is measured. The invention allows the user of grading and scheduling engine 70 to set this parameter according to their stability objectives. In addition, as discussed above, the invention allows the user of grading and scheduling engine 70 to weight the stability objective with more or less importance as compared with other objectives.

The levelness objective is a measure of how constantly parts are consumed. Ideally, parts would be consumed at a constant rate. Because of various options, however, parts may not be consumed at such a constant rate. Depending upon the nature of the part, the difficulty in obtaining additional parts, the cost of maintaining an inventory of the part and the quantity of the parts consumed, levelness may be a more or less important objective at a particular point in the manufacturing facility and/or at particular times of manufacturing. Levelness may be calculated using the following formula:

$$\text{levelness} = w_1 l_1 + w_2 l_2 + \ldots w_n l_n$$

Each "$w_x$" term refers to a weighting factor for a particular attribute. Each "$1_x$" term refers to a levelness score that may be calculated using the following formula:

$$l_1 = y_1 - (t_1 \times k)$$

The term "$y_1$" refers to the actual number of jobs scheduled within a window (batch or bucket) that have the particular attribute. The term "k" refers to the total number of jobs scheduled within the window so far. The term "$t_1$" refers to the target percentage of the attribute in each bucket. The target percentage of a particular attribute for each bucket is determined by taking a statistical average of the consumption of the attribute over time. This value may be recalculated periodically, such as once a day, or may be manually adjusted by the user of grading and scheduling engine 70 to take into account an unusually high or low consumption of a particular attribute.

Another objective implemented by the present invention is the objective of spacing. At certain points in a manufacturing plant, it may be desirable to have a certain number of consecutive products with a particular attribute or it may be desirable to maintain, a minimum spacing between products of a certain type with a particular attribute. For example, in an automobile assembly plant a paint shop 60 may have four parallel painting areas. There, it may be desirable to space cars to be painted such that every fourth car is painted the same color. This would allow uniform utilization of each of the four lines. This type of spacing can be accomplished by employing a modulus to establish a spacing rule such that there are at least a given number of products without a given attribute between two products with that attribute.

A different type of spacing rule would seek to make sure that there were at least some number of physical products in a row with a particular attribute. A factor may be calculated for the spacing objective by assigning a numerical value to violations of one of the spacing rules. Spacing is determined by keeping track of whether or not particular product order records in a sequence contain certain order attributes. A queue structure could be used to facilitate this function. A separate queue may be associated with each spacing rule and may maintain a list of a certain number of previous product order records. The queue can be used to determine from those records whether or not the spacing rule has been satisfied or violated. As a new record is added to the queue, another record is deleted. Alternatively, a pair of counters could be used to keep track of spacing. One counter would be incremented each time a particular attribute appeared and the other would be set to zero at that point. The other counter would be incremented each time the attribute does not appear and the first counter would be set to zero upon the occurrence of that condition. The importance of spacing may depend upon the particular evaluation point within the manufacturing facility and/or the particular conditions in a manufacturing facility at any given time.

Another objective that may be taken into account by the present system relates to responsiveness. Responsiveness is a measure of how quickly the manufacturing facility produces a physical product in response to a customer order. A manufacturer may want to assign higher priority to certain customer-configured orders or orders configured to match a popular configuration often requested by customers. An objective factor to measure responsiveness may thus be used by grading and scheduling engine 70 for scheduling and assignment of product orders. Depending upon the type of order involved, a target processing time for the order may be stored as an attribute of the product order record. Responsiveness may then be calculated using the following formula:

$$\text{responsiveness} = w_1 \times (t_c - \text{age})$$

The term "$w_1$" represents the weight to be assigned to the responsiveness factor. The term "$t_c$" refers to the critical time at which an order should be completed to satisfy the manufacturing facility's customer responsiveness goal. The age term refers to the age of the customer order. Accordingly, as the order gets older and the critical time for completion approaches, the importance of fulfilling the customer order increases.

FIG. 3 is a flowchart illustrating the operation of computer scheduling and order assignment system 50. In step 72, physical attribute data pool 56 receives output from manufacturing process evaluation points such as body shop 58, paint shop 60, and/or general assembly 62. The appropriate physical attribute records within physical attribute data pool 56 are updated at this point. Next, in step 74, physical product sets 64 for each evaluation point are updated. In step 76, unique physical product sets 66 are updated. In this embodiment, a unique physical product set 66 comprises a set of the oldest unique physical products for each evaluation point.

Continuing with step 78, an order choices set 68 is associated with each entry of each unique physical product set 66. Then, in step 80, it is determined whether there are any hold conditions currently existing within the manufacturing facility. A hold condition will prevent the use of various physical attributes for a certain period of time. If a hold condition exists, then hold conditions are placed on specific orders on step 82. Otherwise, the procedure continues in step 84.

In step 84, a grade is computed for each product order record in each order choices set 68. Grades are not computed for orders on which hold conditions were placed in step 82. Based upon the grade computed for each product order record, product order records are reassigned to different physical attribute records and relationship table 54 is updated in step 86. Also, based upon the grade values, the initial order stream and the physical stream of products at each evaluation point in the manufacturing facility may be adjusted in step 88. One or more of these streams may not be adjusted in response to changes in the unique physical product set 66 associated with that stream. The system then waits for additional output to be received from manufacturing process evaluation points in step 72.

Although the present invention has been described in detail, it should be understood that various changes, substitutions and alterations can be made hereto without departing from the spirit and scope of the invention as defined by the appended claims.

What is claimed is:

1. A method for associating a product order record with a physical attribute record, comprising:

maintaining a pool of product order records, each product order record corresponding to a product order and comprising a plurality of order attributes;

maintaining a pool of physical attribute records, each record comprising a list of physical attribute data items collectively identifying existing physical features of a product;

maintaining a first list of partially completed physical products available at an evaluation point in a manufacturing facility, the first list including a first physical attribute record;

computing, using a digital computer, a grade value for each of a plurality of product order records each having a list of order attributes comprising sets of which the list of physical attribute data items associated with the first physical attribute record is a subset, the grade value comprising a weighted sum of a plurality of objective factors, each objective factor comprising a numerical measure of how well a particular objective is being met; and associating one of the plurality of product order records with the first physical attribute record based upon the grade value of each of the plurality of product order records.

2. The method of claim 1, wherein one of the objective factors comprises a numerical measure of responsiveness to market demand.

3. The method of claim 2, wherein the objective factors comprise a numerical measure of an objective selected from the group consisting of attribute stability, attribute levelness, or attribute spacing.

4. The method of claim 2, wherein one of the objective factors comprises a numerical measure of attribute stability;
wherein one of the objective factors comprises a numerical measure of attribute levelness; and
wherein one of the objective factors comprises a numerical measure of attribute spacing.

5. The method of claim 1, wherein one of the objective factors comprises a numerical measure of attribute spacing and wherein attribute spacing is measured using a modulus.

6. The method of claim 1, wherein one of the objective factors comprises a numerical measure of attribute stability wherein attribute stability is measured based upon a comparison between the total number of physical attribute records having a particular physical attribute data item appearing within a partially complete bucket collection of physical attribute records to which the first physical attribute record is to be added and a scheduled target comprising the desired total number of physical attribute records containing the particular physical attribute data item that are to appear in the complete bucket collection of physical attribute records.

7. The method of claim 1, wherein one of the objective factors comprises a numerical measure of attribute levelness wherein attribute levelness is measured based upon a comparison between the total number of physical attribute records having a particular physical attribute data item appearing within a partially complete bucket collection of physical attribute records to which the first physical attribute record is to be added and a levelness target comprising the desired total number of physical attribute records containing the particular physical attribute data item that are to appear in the complete bucket collection of physical attribute records.

8. The method of claim 1, further comprising:
disassociating a product order record with the first physical attribute record based upon the grade value of each of the plurality of product order records, wherein the disassociated product order record was previously associated with the first physical attribute record.

9. The method of claim 1, wherein the manufacturing facility comprises an automobile assembly plant and wherein the evaluation point comprises the emergence of a partially manufactured vehicle from a paint shop facility.

10. The method of claim 1, wherein the manufacturing facility comprises an automobile assembly plant and wherein the evaluation point comprises the emergence of a partially manufactured vehicle from a body shop facility.

11. Computer software for associating a product order record with a physical attribute record, comprising:
a computer readable storage medium; and
software stored on the computer readable storage medium, the software operable to
maintain a pool of product order records, each product order record corresponding to a product order and comprising a plurality of order attributes,
maintain a pool of physical attribute records, each record comprising a list of physical attribute data items collectively identifying existing physical features of a product;
maintain a first list of partially completed physical products available at an evaluation point in a manufacturing facility, the first list including a first physical attribute record,
compute a grade value for each of a plurality of product order records each having a list of order attributes comprising sets of which the list of physical attribute data items associated with the first physical attribute record is a subset, the grade value comprising a weighted sum of a plurality of objective factors, each objective factor comprising a numerical measure of how well a particular objective is being met, and
associate one of the plurality of product order records with the first physical attribute record based upon the grade value of each of the plurality of product order records.

12. The computer software of claim 11, wherein one of the objective factors comprises a numerical measure of responsiveness to market demand.

13. The computer software of claim 12, wherein the objective factors comprise a numerical measure of an objective selected from the group consisting of attribute stability, attribute levelness, or attribute spacing.

14. The computer software of claim 12, wherein one of the objective factors comprises a numerical measure of attribute stability;
wherein one of the objective factors comprises a numerical measure of attribute levelness; and
wherein one of the objective factors comprises a numerical measure of attribute spacing.

15. The computer software of claim 12, wherein one of the objective factors comprises a numerical measure of attribute spacing and wherein attribute spacing is measured using a modulus.

16. The computer software of claim 12, wherein one of the objective factors comprises a numerical measure of attribute stability wherein attribute stability is measured based upon a comparison between the total number of physical attribute records having a particular physical attribute data item appearing within a partially complete bucket collection of physical attribute records to which the first physical attribute record is to be added and a scheduled target comprising the desired total number of physical attribute records containing the particular physical attribute data item that are to appear in the complete bucket collection of physical attribute records.

17. The computer software of claim 12, wherein one of the objective factors comprises a numerical measure of attribute levelness wherein attribute levelness is measured based upon a comparison between the total number of physical attribute records having a particular physical attribute data item appearing within a partially complete bucket collection of physical attribute records to which the first physical attribute record is to be added and a levelness target comprising the desired total number of physical attribute records containing the particular physical attribute data item that are to appear in the complete bucket collection of physical attribute records.

18. The computer software of claim 12, wherein the software is further operable to disassociate a product order record with the first physical attribute record based upon the grade value of each of the plurality of product order records, wherein the disassociated product order record was previously associated with the first physical attribute record.

19. The computer software of claim 11, wherein the grade value is computed using a weight associated with each objective factor and wherein each weight is adjustable by the user of the software.

20. The computer software of claim 11, wherein the software is further operable to select one of the partially completed physical products to next send to a following manufacturing step based upon a grade value computed for all product order records associated with physical products available at the evaluation point.

21. A method for associating a product order record with a physical attribute record, comprising:

maintaining a pool of product order records, each product order record corresponding to a product order and comprising a plurality of order attributes;

maintaining a pool of physical attribute records, each record comprising a list of physical attribute data items collectively identifying existing physical features of a product;

maintaining a first list of partially completed physical products available at an evaluation point in a manufacturing facility, the first list including a first physical attribute record;

computing, using a digital computer, a grade value for each of a plurality of product order records each having a list of order attributes comprising sets of which the list of physical attribute data items associated with the first physical attribute record is a subset, the grade value proportional to the age of the order associated with the product order record; and associating one of the plurality of product order records with the first physical attribute record based upon the grade value of each of the plurality of product order records.

* * * * *